(12) United States Patent
Xu (10) Patent No.: US 11,530,789 B2
(45) Date of Patent: Dec. 20, 2022

(54) SOLAR-POWERED, FLOATING, FOUNTAIN LAMP

(71) Applicant: GUANGDONG MINGLUN OPTOELECTRONICS TECHNOLOGY CO., LTD., Dongguan (CN)

(72) Inventor: Yiqun Xu, Dongguan (CN)

(73) Assignee: GUANGDONG MINGLUN OPTOELECTRONICS TECHNOLOGY CO., LTD., Dongguan (CN)

(*) Notice: Subject to any disclaimer, the term of this patent is extended or adjusted under 35 U.S.C. 154(b) by 0 days.

(21) Appl. No.: 17/644,436

(22) Filed: Dec. 15, 2021

(65) Prior Publication Data
US 2022/0341554 A1    Oct. 27, 2022

(30) Foreign Application Priority Data

Apr. 22, 2021  (CN) .......................... 202110439159.3
Apr. 22, 2021  (CN) .......................... 202120841447.7

(51) Int. Cl.
| | |
|---|---|
| F21S 9/03 | (2006.01) |
| F21V 23/04 | (2006.01) |
| F21V 33/00 | (2006.01) |
| F21S 10/00 | (2006.01) |
| F21W 121/02 | (2006.01) |
| B05B 17/08 | (2006.01) |
| F21W 111/047 | (2006.01) |

(52) U.S. Cl.
CPC .......... *F21S 9/037* (2013.01); *F21V 23/0442* (2013.01); *F21V 33/008* (2013.01); *B05B 17/08* (2013.01);
(Continued)

(58) Field of Classification Search
CPC .......... F21W 2121/02; F21W 2111/047; B05B 17/08; B05B 17/085; F21S 10/002;
(Continued)

(56) References Cited

U.S. PATENT DOCUMENTS

| | | | | |
|---|---|---|---|---|
| 6,375,090 B1 | * | 4/2002 | Beidokhti | F21S 9/028 239/18 |
| D836,751 S | * | 12/2018 | Li | D23/201 |

(Continued)

FOREIGN PATENT DOCUMENTS

| | | | |
|---|---|---|---|
| CN | 2797856 Y | * | 7/2006 |
| CN | 200958714 Y | * | 10/2007 |

(Continued)

*Primary Examiner* — Colin J Cattanach
(74) *Attorney, Agent, or Firm* — Michael X. Ye; Rimon, PC (57) ABSTRACT

The present invention relates a solar-powered, floating, fountain lamp, comprising a light-emitting elements, a fountain housing, and a solar panel, and the fountain housing acts not only as a three-dimensional lampshade for a first light-emitting portion, but also as a floating portion of the fountain lamp, and the fountain housing is substantially formed by a saucer-shaped cabin and a cylindrical lower part that are integratedly connected to each other, in which the saucer-shaped cabin located in an axially upper part of the fountain housing has an outer peripheral surface that is smooth and curved, and the plurality of light-emitting elements each project a light beam in a different direction, and the light-emitting elements projecting the light beams outward the fountain housing form point light sources at a top of the fountain lamp, the point light sources on the top act as a second light-emitting portion, and the light-emitting elements projecting the light beams inward the fountain housing form the first light-emitting portion, and the first light-emitting portion provides uniform lighting through the three-dimensional lampshade formed by outer walls of the saucer-shaped cabin and of the cylindrical lower part that are smoothly connected.

18 Claims, 5 Drawing Sheets

(52) U.S. Cl.
CPC ............... *B05B 17/085* (2013.01); *F21S 9/03* (2013.01); *F21S 9/032* (2013.01); *F21S 9/035* (2013.01); *F21S 10/002* (2013.01); *F21W 2111/047* (2013.01); *F21W 2121/02* (2013.01)

(58) Field of Classification Search
CPC .... F21S 9/03; F21S 9/032; F21S 9/035; F21S 9/037
See application file for complete search history.

(56) References Cited

U.S. PATENT DOCUMENTS

| | | | | |
|---|---|---|---|---|
| 2006/0163375 | A1* | 7/2006 | Skluzacek | B05B 17/08 239/18 |
| 2006/0243819 | A1* | 11/2006 | Beidokhti | F21V 29/51 239/18 |
| 2011/0240757 | A1* | 10/2011 | Selk | B05B 17/08 239/18 |
| 2020/0316620 | A1* | 10/2020 | Xu | F21S 10/002 |

FOREIGN PATENT DOCUMENTS

| | | | | |
|---|---|---|---|---|
| CN | 201530253 | U | * | 7/2010 |
| CN | 105508921 | A | * | 4/2016 |
| CN | 109876989 | A | * | 6/2019 |
| CN | 209061459 | U | * | 7/2019 |
| GB | 2405922 | A | * | 3/2005 |
| JP | 2007280686 | A | * | 10/2007 |
| KR | 20090124557 | A | * | 12/2009 |

\* cited by examiner

SOLAR-POWERED, FLOATING, FOUNTAIN LAMP

This application claims the benefit of the Chinese Patent Applications No. CN 202110439159.3 filed on Apr. 22, 2021, and No. CN 202120841447.7 filed on Apr. 22, 2021, which are hereby incorporated by reference as if fully set forth herein.

BACKGROUND OF THE INVENTION

1. Technical Field

The present invention relates to a lighting equipment, and more particularly to a solar-powered, floating, fountain lamp.

2. Description of Related Art

With the development of modernization, energy has become increasingly scarce. This makes exploitation and use of renewable energy, particularly solar energy, a topic attracting more and more attention and having extensive applications. Solar energy is currently widely used in lighting in the forms of, for example, solar streetlamps, solar landscape lamps, and so on, for the advantages such as being safe, energy-saving, pollution-free, power-saving, maintenance-free, and simple wiring. These advantages also enable solar lamps to have great versatileness in terms of entertainment and decoration. However, the existing solar landscape lamps are typically fixedly installed on posts or on lawns. As compared to traditional landscape lamps, they only provide improvement in energy use, and fail to realize the full potential of solar power in terms of entertainment and decoration.

For example, China Patent Application Publication No. CN206504207U discloses a fountain lamp, comprising a housing and a water pipe cylinder passing through the center of the housing. The housing is of an upward-opening, cylindrical structure and comprises upper and lower parts extending oppositely from two ends of the housing. The side walls of the housing are provided with evenly distributed fixing holes and connecting rods installed in the fixing holes. The upper and lower parts of the housing are peripherally provided with evenly distributed threaded holes, so that the upper and lower parts can be held together by screws working with the threaded holes. As both of the upper and lower parts has the threaded holes, the resulting fixation is firm and secure, and this leads to a solid and reliable overall structure with an increased size, thereby enabling large-area and high-illumination fountain-decorated lighting. However, the prior invention still has some shortcomings. For example, the lighting effect of the prior-art device is relatively monotonous and unable to provide users with enriched three-dimensional visual aesthetics. In addition, the prior-art device highly relies on screw-based fixation, and tends to have issues about water seepage over time, which means a high incidence of electronic damages. In view of this, the inventor has paid great efforts to make structural improvement of solar landscape lamps and devises the present invention.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides a solar-powered, floating, fountain lamp, comprising a light-emitting elements, a fountain housing, and a solar panel that is water-tightly mounted on a top of the fountain housing, wherein, the fountain housing acts not only as a three-dimensional lampshade for a first light-emitting portion, but also as a floating portion of the fountain lamp, wherein, the fountain housing is substantially formed by a saucer-shaped cabin and a cylindrical lower part that are integratedly connected to each other, in which the saucer-shaped cabin located in an axially upper part of the fountain housing has an outer peripheral surface that is smooth and curved, and the plurality of light-emitting elements each project a light beam in a different direction, wherein, the light-emitting elements projecting the light beams outward the fountain housing form point light sources at a top of the fountain lamp, the point light sources on the top act as a second light-emitting portion, such that a light cone formed in a light-projecting direction of the second light-emitting portion interferes with a water column and colors the sprayed water column, and wherein, the light-emitting elements projecting the light beams inward the fountain housing form the first light-emitting portion, and the first light-emitting portion provides uniform lighting through the three-dimensional lampshade formed by outer walls of the saucer-shaped cabin and of the cylindrical lower part that are smoothly connected.

According to one preferred embodiment, a pumping chamber is arranged inside the cylindrical lower part radially, which accommodates a water pump, of which a outlet pipe axially passes through an inner cavity of the fountain housing for axially guiding water from an outlet of the water pump to the saucer-shaped cabin, thereby enabling formation of plural said water columns sprayed outward.

According to one preferred embodiment, the saucer-shaped cabin accommodates therein a circuit board for controlling and/or driving the water pump and/or the light-emitting elements, in which a liquid sensor connected to or integrated with the circuit board is used to control start/stop of the water pump and/or to control start/stop of at least one said light-emitting element.

According to one preferred embodiment, the liquid sensor electrically connected to the circuit board, and the outlet pipe of the water pump as well as wiring of the water pump enter the pumping chamber by water-tightly passing through a floor of the saucer-shaped cabin that acts as a ceiling of the pumping chamber, and wherein, the liquid sensor, the outlet pipe, and/or the wiring are located outside light-projecting paths of the light-emitting elements, particularly outside a light path from the first light-emitting portion toward the three-dimensional lampshade.

According to one preferred embodiment, as compared to all other electronic components located inside the saucer-shaped cabin, the light-emitting elements forming the first light-emitting portion are all radially closer to the smooth, curved outer peripheral surface of the saucer-shaped cabin, so that all the other electronic components are located outside the light path from the first light-emitting portion toward the three-dimensional lampshade.

According to one preferred embodiment, the circuit board controls the light-emitting elements to emit light beams with diverse color temperatures, hues and/or luminance, in which the circuit board is axially located on a top of the saucer-shaped cabin and is closely attached to a back of the solar panel arranged at the top of the fountain housing, so that the light-emitting elements forming the second light-emitting portion project the light beams outward through an opening of the solar panel or through a transparent window of the solar panel.

According to one preferred embodiment, the liquid sensor is constructed from a bipolar needle electrode, which starts from the circuit board inside the air-tight saucer-shaped cabin and water-tightly passes through the ceiling of the pumping chamber, so as to enable said start/stop of the water pump and/or said start/stop of the light-emitting elements by means of contacting with liquid in the pumping chamber.

According to one preferred embodiment, the cylindrical lower part is defined by a two-layer wall comprising an inner layer and an outer layer, and an air-tight circular chamber that is communicated with the saucer-shaped cabin is formed between the inner layer and the outer layer, in which the inner layer of the two-layer wall of the cylindrical lower part acts as a peripheral wall of the pumping chamber for installing the water pump, and the outer layer of the two-layer wall of the cylindrical lower part is smoothly connected to the outer wall of the saucer-shaped cabin, so as to form an outer surface of the three-dimensional lampshade that facilitates uniform light projection.

According to one preferred embodiment, at least one mount port is provided at an axially lower part of the pumping chamber for receiving a filter plate and/or for allowing the fountain housing to be connected to an external component at its lower part.

According to one preferred embodiment, the external component is a cleaning and sterilizing portion, which serves to clean and sterilize waters the fountain lamp floats by. The cleaning and sterilizing portion is composed of a foldable, roughly cylindrical storage chamber. The cleaning and sterilizing portion is connected to the lower part of the fountain housing through the mount port. The storage chamber is peripherally provided with permeable holes.

The present invention provides at least the following technical benefits.

Firstly, in the present invention, light-emitting elements projecting light outward the fountain housing act as point light sources at the top. These point light sources form a second light-emitting portion, and the light cone formed in a light-projecting direction of the second light-emitting portion interferes with a water column made by the fountain lamp and endows the water column with colors. The light-emitting elements projecting light inward the fountain housing form a first light-emitting portion, and the first light-emitting portion provides uniform lighting through a three-dimensional lampshade formed by outer walls of the saucer-shaped cabin and of the cylindrical lower part that are smoothly connected.

Secondly, the light-emitting elements are configured to at least project light toward an area axially below the fountain housing, so as to illuminate water axially below the fountain housing with light of at least one color, thereby adding the atmosphere in which the disclosed fountain lamp is used with a sci-fi touch.

Thirdly, in the disclosed fountain lamp, the pumping chamber is provided with a circular ridge that is configured to reduce or eliminate jittering of the fountain housing caused by wave peak overlap occurring when liquid streaming into the pumping chamber has the liquid surface repeatedly hits and oscillates against the peripheral wall of the pumping chamber.

Fourthly, in the disclosed fountain lamp, the pumping chamber defines therein a semi-closed space, and the joint between the outlet pipe and the first opening is located at the zenith of the semi-closed space. Working jointly, the inner wall of the semi-sealed chamber and the surface of the liquid streaming into the pumping chamber confine gas left in the pumping chamber in the semi-sealed chamber. Thereby, the foregoing gas helps further prevent the liquid in the pumping chamber from entering the saucer-shaped cabin through the joint between the outlet pipe and the first opening and in turn protect electronic components in the saucer-shaped cabin, such as the circuit board.

Fifthly, in the disclosed fountain lamp, the water pump is installed inside the pumping chamber using at least a first support point, a second support point and a third support point on the ridge in the pumping chamber (the joint between the water pump and the outlet pipe) by means of three-point fixation. This secures the water pump in position and thereby reduces potential vibrations of the fountain housing happening during operation of the fountain lamp. The three-point fixation further prevents unintentional displacement of the water pump during operation as might otherwise happen if the water pump is directly installed in the pumping chamber and the combination between the water pump and the pumping chamber loosens.

Sixthly, with the outlet pipe connected to one side of the water pump off-center, as the water pump operates, due to its own imbalanced movement, the fountain housing not only rotates about an axis direction of the fountain lamp, but also makes the fountain lamp move in a radial direction. The fountain housing so operates together with the light from the light-emitting elements projected through the fountain housing and the water columns created by the water pump, forms dynamic fountain scenery.

DETAILED DESCRIPTION OF THE INVENTION

The invention will be described in detail with reference to the accompanying drawings.

Embodiment 1

As shown in FIG. 1, FIG. 2, FIG. 4 and FIG. 5, a solar-powered, floating, fountain lamp comprises light-emitting elements 1, a fountain housing 2, and solar panels 3 water-tightly mounted on the top of the fountain housing 2. The fountain housing 2 forms not only a three-dimensional lampshade for a first light-emitting portion, but also a floating portion of the fountain lamp as a whole. The fountain housing 2 is substantially constructed from a saucer-shaped cabin 201 and a cylindrical lower part 202 that are integratedly connected to each other. The saucer-shaped cabin 201 located axially upper has its outer peripheral surface made smooth and curved. The outer diameter of the saucer-shaped cabin 201 is greater than the outer diameter of the cylindrical lower part 202 connected thereunder. A plurality of light-emitting elements 1 may each project a light beam in a different direction respectively. The light-emitting elements 1 projecting light outward the fountain housing 2 form several point light sources located atop. The point light sources located atop form the second light-emitting portion such that a light cone formed in a light-projecting direction of the second light-emitting portion interferes with one or more water columns made by the fountain lamp and endows the water columns with colors. The light-emitting elements 1 projecting light inward the fountain housing 2 form the first light-emitting portion. The first light-emitting portion provides uniform lighting through the three-dimensional lampshade formed by outer walls of the saucer-shaped cabin 201 and of the cylindrical lower part 202 that are smoothly connected.

Preferably, the light-emitting elements 1 may each be an LED lamp. Preferably, the number of the light-emitting elements 1 may be of plurality. Preferably, the light-emitting elements 1 may project light in different directions. Preferably, the light-projecting direction of each of the light-emitting elements 1 may be selected during its installation. For example, the pins of the light-emitting elements 1 have a certain length and can be bent after installation to change the light-projecting directions of lamp beads, so as to make the light-emitting elements 1 project light in different directions. Preferably, the second light-emitting portion may be used to endow the water columns made by the water pump 6 with at least one color. Preferably, the light-emitting elements 1 projecting light inward the fountain housing 2 form the first light-emitting portion. Preferably, the point light sources at the top of the fountain housing 2 act as the second light-emitting portion, so as to create a visual image of a UFO. Preferably, the point light sources may be arranged peripherally about the center of the solar panels 3. Preferably, the color of light from the second light-emitting portion may be at least sometimes different from the light color of the first light-emitting portion. Preferably, activation of the second light-emitting portion and activation of formation of the water columns may be simultaneous. Preferably, the second light-emitting portion and the water pump 6 share a common power source. Preferably, the first light-emitting portion provides uniform lighting through the three-dimensional lampshade formed by outer walls of the saucer-shaped cabin 201 and of the cylindrical lower part 202 that are smoothly connected. With the foregoing configuration, the light-emitting elements 1 projecting light outward the fountain housing 2, on one hand, form several point light sources at the top, which act as a second light-emitting portion to give the resulting fountain a sci-fi effect; and the second light-emitting portion, on the other hand, creates a light cone in a light-projecting direction of the second light-emitting portion that interferes with a water column and colors the sprayed water columns with at least one color. In addition, the color of the second light-emitting portion may at least sometimes different from the light color of the first light-emitting portion. The cooperation among the fountain housing 2, the first light-emitting portion, the second light-emitting portion, and the water columns created by the water pump 6 enables the disclosed fountain lamp to provide unique scenery of the vivid blend of light and dancing water.

Preferably, the fountain housing 2 may act as a three-dimensional lampshade for the first light-emitting portion. Preferably, the cylindrical lower part 202 is defined by a two-layer wall comprising an inner layer and an outer layer, and an air-tight circular chamber is formed between the inner layer and the outer layer. Preferably, the inner layer of the two-layer wall of the cylindrical lower part 202 may define a pumping chamber 202a for the water pump 6 to install therein. Preferably, the saucer-shaped periphery of the saucer-shaped cabin 201 may defined by a curved outer wall. Preferably, the outer peripheral wall of the saucer-shaped cabin 201 has a smooth, curved appearance. Preferably, the outer peripheral wall of the saucer-shaped cabin 201 has atop a chamfered portion at which it turns and extends radially inward to form a carrying board for the solar panels 3. Preferably, the outlet pipe 9 of the water pump 6 is connected to the top of the water pump 6 off-center. With the foregoing configuration, as the water pump 6 operates, due to its own imbalanced movement, the fountain housing not only rotates about an axis direction of the fountain lamp, but also makes the fountain lamp move in a radial direction. This, together with the light emitted by the light-emitting elements 1 through the fountain housing 2 and the water columns created by the water pump 6, forms dynamic fountain scenery. Preferably, a first opening is formed at the middle of the top surface of the pumping chamber 202a for receiving the outlet pipe 9 of the water pump 6. Preferably, the outlet pipe 9 has its one end far away from the water pump 6 provided with a nozzle for forming fountains using the water pumped by the water pump 6. Preferably, the fountain housing 2 may be integratedly formed. Preferably, the fountain housing 2 may be shaped like a flying saucer, thereby adding the disclosed lamp with aesthetics and a sci-fi touch. Preferably, the fountain housing 2 as a whole may look like a flying saucer so that its center of gravity and geometric center are both located on the axis of the saucer-like housing. Preferably, the fountain housing 2 may be made of PE resin. Preferably, the fountain housing 2 may have a consistent thickness across its periphery, so as to maintain consistent transmittance for light passing through the housing. With this configuration, it is ensured that light beams coming out of the fountain housing 2 at various angles have the same light intensity. In other words, uniform illumination or consist visual effects can be achieved whether above or below the water surface. Additionally, the consistent thickness of the fountain housing 2 may also ease manufacturing of the model for forming the fountain housing 2, which in turn reduces the costs for manufacturing the fountain housing 2. Preferably, the fountain housing 2 may be made integratedly as a unity. Preferably, the inner wall of the fountain housing 2 may have no bending portions, and the outer wall of the fountain housing 2 may have no mount holes, notches, recesses or bending portions. Preferably, the inner wall of the housing may be of a single-layer structure so as to minimize opacity of the fountain housing 2 with respect to the light from the light-emitting elements 1. Preferably, the fountain housing 2 may act as a floating portion of the disclosed fountain lamp. Preferably, the fountain housing 2 may have its center of gravity and geometric center both located on its axis. Preferably, the inner wall of the fountain housing 2 has a consistent thickness across its periphery. Preferably, the fountain housing 2 has no radial bending portion.

Preferably, the solar panels 3 may be used to receive external light and convert the received light into electric power. Preferably, the solar panels 3 may form a cap of the entire fountain lamp to protect the interior of the housing from the splash of the fountain. Preferably, the solar panels 3 may have a third opening for receiving the outlet pipe 9 of the water pump 6. Preferably, the third opening holds the outlet pipe 9 in position water-tightly. Preferably, the third opening is located at the center of the solar panels 3. Preferably, the receiving surfaces of the solar panels 3 each have solar tiles arranged thereon in a fan-like pattern. Preferably, the solar panels 3 are water-tightly fixed to the top of the fountain housing 2. Preferably, the solar panels 3 and the fountain housing 2 have their top flanges level with each other to from a flat surface. Preferably, the solar cell panels circle a third opening for the outlet pipe 9 to pass through. Preferably, the solar panels are water-tightly arranged along the periphery of the third opening.

Preferably, the outer layer of two-layer wall of the cylindrical lower part 202 is smoothly connected with the outer wall of the saucer-shaped cabin 201, so as to form the outer wall of the three-dimensional lampshade for uniform light projection. Preferably, the inner wall of the circular chamber 202b acts as the inner layer of two-layer wall of the cylindrical lower part 202. Preferably, the floor of the saucer-shaped cabin 201 forms the ceiling of the pumping chamber 202a.

Figure 1:
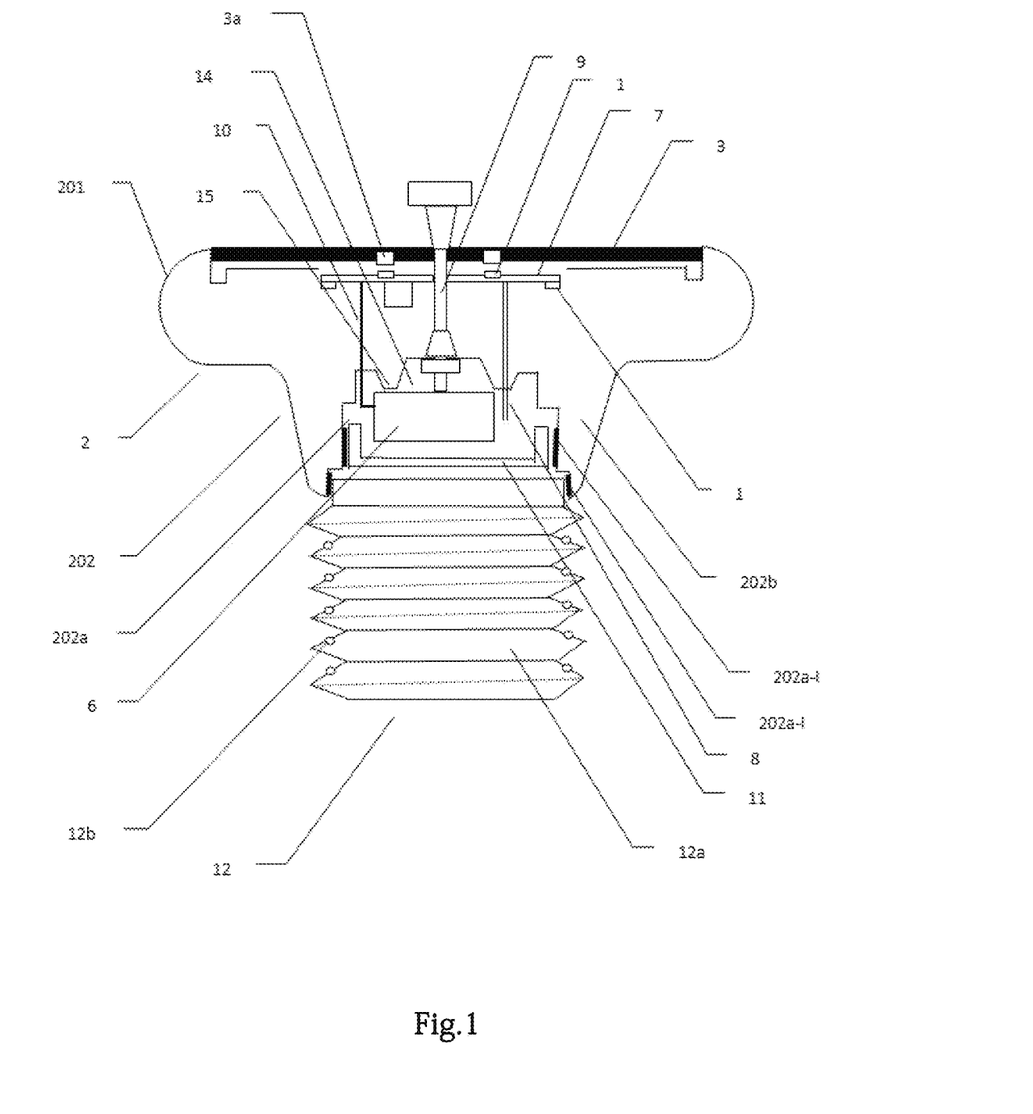
FIG. 1 is a vertical cross-sectional view of one preferred embodiment of the present invention.
Figure 2:
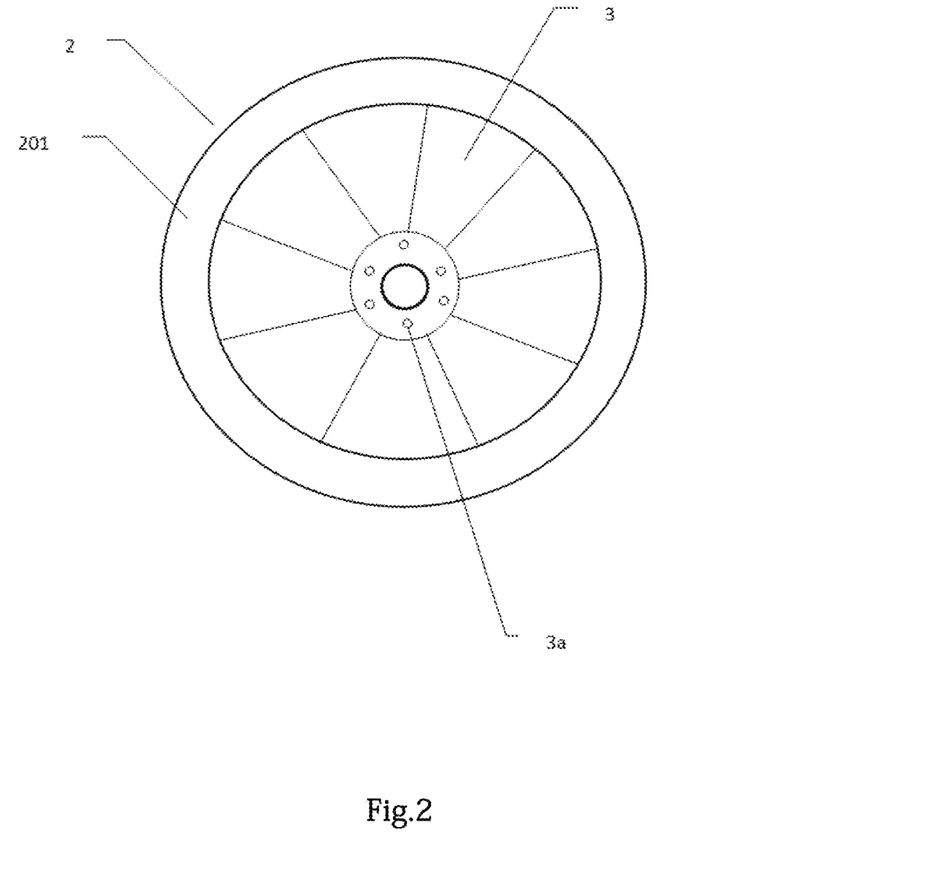
FIG. 2 is a top view of the preferred embodiment of the present invention.

According to one preferred embodiment, as shown in FIG. 1, the cylindrical lower part 202 defined radially therein the pumping chamber 202a. Preferably, the pumping chamber 202a accommodates the water pump 6 therein. Preferably, the outlet pipe 9 of the water pump 6 axially passes through the inner cavity of the fountain housing 2 for transporting water from the outlet of the water pump 6 axially to the saucer-shaped cabin 201 to form water columns sprayed outward. Preferably, the fountain housing 2 may be primarily composed of the pumping chamber 202a and the saucer-shaped cabin 201 communicated with each other. Preferably, the pumping chamber 202a and the saucer-shaped cabin 201 have their inner cavities isolated from each other so as to prevent gas exchange therebetween. Preferably, the top of the pumping chamber 202a is physically the floor of the saucer-shaped cabin 201b. Preferably, the water pump 6 installed in the pumping chamber 202a is such placed that when the fountain lamp is floating in water, the water pump 6 is immersed in water. Preferably, the outlet pipe 9 may be a metal tube. Preferably, the length of the outlet pipe 9 is greater than the height of the saucer-shaped cabin 201. Preferably, the outlet pipe 9 and the fountain housing 2 are coaxial. Preferably, the peripheral wall of the pumping chamber 202a is a roughly cylindrical wall that extends downward from the bottom of the saucer-shaped cabin 201 (i.e., downward into water). Preferably, the top of the saucer-shaped cabin 201 is covered by the solar panels. Preferably, the saucer-shaped periphery of the saucer-shaped cabin 201 may be defined by its curved outer wall. Preferably, the outer peripheral wall of the saucer-shaped cabin 201 has a smooth, curved profile. Preferably, the outer peripheral wall of the saucer-shaped cabin 201 has atop a chamfered portion from which it turns and extends inward radially, thereby forming the carrying board for the solar panels 3. Preferably, the bottom of the pumping chamber 202a is communicated with water through a filter plate 11. Preferably, the outlet pipe 9 is connected to the top of the water pump 6 off-center. Thereby, as the water pump 6 operates, due to its own imbalanced movement, the fountain housing 2 not only rotates about an axis direction of the fountain lamp, but also makes the fountain lamp move in a radial direction. The fountain housing so operates together with the light from the light-emitting elements 1 projected through the fountain housing 2 and the water columns created by the water pump 6, forms dynamic fountain scenery. Preferably, a first opening is formed in the middle part of the top surface of the pumping chamber 202a for allowing the outlet pipe 9 to pass through.

According to one preferred embodiment, the saucer-shaped cabin 201 accommodates therein a circuit board 7 for controlling and/or driving the water pump 6 and/or the light-emitting elements 1. Preferably, a liquid sensor 8 connected to or integrated with the circuit board 7 serves to control start/stop of the water pump 6 and/or to control start/stop of at least one light-emitting element 1. Preferably, the circuit board 7 may receive power supplied by the solar panels and converts the power into a motive force that drives the water pump 6 and/or the light-emitting element 1. Preferably, the circuit board 7 may be equipped with a power control unit. Preferably, the power control unit may be connected to or may incorporate the liquid sensor 8.

Preferably, the liquid sensor 8 may serve to control start/stop of the water pump 6 and/or to control start/stop of the first light-emitting portion and the second light-emitting portion. Preferably, the power control unit may be connected to or may incorporate a light sensor. Preferably, the light sensor may be installed on the circuit board 7 or on the receiving surface of the solar panel. Preferably, the power control unit uses the light sensor to control start/stop of the water pump 6. Preferably, the power control unit is further used to control charging/discharging of the solar panel. Preferably, the liquid sensor 8 may be formed by at least one bipolar needle electrode. Preferably, the bipolar needle electrode may have its one end in direct electrical contact with the circuit board 7. Preferably, the bipolar needle electrode may have its the other end at least extending below the liquid surface, so that the bipolar needle electrode realizes circuit gate of the water pump and/or the light-emitting elements by contacting with liquid. Preferably, the bipolar needle electrode may have its one end in direct electrical contact with the circuit board 7, so as to significantly reduce or eliminate the use of metal leads inside the fountain housing 2, thereby preventing undesired shadows of the leads appearing when light from the light-emitting elements 1 coming out of the fountain housing 2. Preferably, the circuit board 7 may be shorted when the liquid sensor contacts water, thereby meeting the working requirement for activation of the water pump 6 and/or the light-emitting element 1. Preferably, a photosensitive switch may be used to detect the ambient light around the housing, so as to determine whether the requirement for the light-emitting element 1 to start to work is satisfied. Preferably, the photosensitive switch may be located on the upper surface of a control panel to positionally correspond to the second light-emitting portion. Preferably, the photosensitive switch is in direct electrical contact and connection with the control panel. Preferably, the bipolar needle electrode extending downward from the circuit board 7 has its bottom passing through the fountain housing 2. Preferably, the bipolar needle electrode has its the other end extending into the pumping chamber and coming close to the inlet of the water pump, so that the bipolar needle electrode acts as an "in-water activation" trigger when its bottom is in contact with water.

Preferably, a switch may be installed on the surface of the fountain housing 2 and be connected to the power control unit so as to allow a user to operate the switch and in turn control the disclosed fountain lamp. In short, when using the disclosed fountain lamp, a user may first press the switch to activate the power control unit (by, for example, using the light sensor to detect the ambient light around the housing, so as to determine whether the requirement for the light-emitting element 1 to start to work is satisfied), thereby preparing for subsequent activation of the light-emitting elements 1. However, in the present embodiment, charging of the solar panel 3 may be set to be irrelevant to activation of the switch. Specifically, whenever the solar panel 3 receives external light, it outputs photovoltaic power to the power control unit.

Preferably, the working requirement for the water pump 6 and/or the light-emitting elements 1 is satisfied when and only when both of the two happen: 1) the light sensor detects no light; and 2) when the liquid sensor 8 detects that the pumping chamber 202a of the fountain housing 2 is in a liquid, two electrodes are shorted due to their contact with water. For example, the solar panels 3 receive sunlight in the daytime and directly supplies a part of the resulting photovoltaic power to the water pump 6. In the daytime, the water pump 6 may create fountains, but the light-emitting elements 1 stay deactivated, so the rest of the power is used to charge a storage battery (such as a lithium-ion battery). In the nighttime (as determined by the photosensitive switch) when there is no sunlight, the storage battery (such as a lithium-ion battery) starts to power the water pump 6 and the light-emitting elements 1. At this time, the water pump 6 create fountains while the light-emitting elements 1 emit light. Preferably, the working requirement for activation of the water pump 6 and/or the light-emitting elements 1 may be flexibly set according to the practical needs. Preferably, the liquid sensor detects whether the pumping chamber 202a (particularly the inlet of the water pump 6) contacts liquid, and determines, independently or working with the photosensitive switch, whether the working requirement for the light-emitting elements 1 and/or the water pump 6 is met. With the foregoing configuration, it may be shorted by having the liquid sensor contact water, so as to meet the working requirement for activation of the water pump 6 and/or the light-emitting elements 1. This prevents the water pump 6 and/or the light-emitting elements 1 from working outside the working condition set by the user using the working requirement, thereby eliminating unnecessary wear and tear of the water pump 6 and/or the light-emitting elements 1, and/or eliminating waste of the power generated by solar panel 3. For example, the working requirement may be such set that the fountain lamp is not activated until the fountain housing 2 contacts water, or that the light-emitting elements 1 are not turned on in the daytime when the ambient light is strong. Preferably, the power control unit may manage and store the power generated by the solar panel. Preferably, the power control unit may work with the liquid sensor 8 and the photosensitive switch to control activation of the water pump 6. Preferably, the power control unit may control activation of the first and second light-emitting portions through the photosensitive switch. Preferably, the circuit board 7 is provided with a second opening for the outlet pipe 9 to pass through, so that the outlet pipe 9 is allowed to transfer at least a part of heat generated by the circuit board 7 to the exterior of the fountain housing 2. With the foregoing configuration, may be shorted by having the liquid sensor contact water so as to meet the working requirement for activation of the water pump 6 and/or the light-emitting elements 1. This prevents the water pump 6 and/or the light-emitting elements 1 from working outside the working condition set by the user using the working requirement, thereby eliminating unnecessary wear and tear of the water pump 6 and/or the light-emitting elements 1, and/or eliminating waste of the power generated by solar panel 3. For example, the working requirement may be such set that the fountain lamp is not activated until the fountain housing 2 contacts water, or that the light-emitting elements 1 are not turned on in the daytime when the ambient light is strong.

According to one preferred embodiment, the liquid sensor 8 and the outlet pipe 9 of the water pump 6 that are electrically connected to the circuit board 7, together with the wiring 10 of the water pump 6, water-tightly pass through the floor of the saucer-shaped cabin 201 that act as the ceiling of the pumping chamber 202a and then enter the pumping chamber 202a. Preferably, the liquid sensor 8, the outlet pipe 9 and/or the wiring 10 all are located outside the light-projecting paths of the light-emitting elements 1, particularly outside the light path from the first light-emitting portion toward the three-dimensional lampshade. Preferably, the wiring 10 of the water pump 6 may be a lead wrapped by a metal tube. Preferably, the light-emitting elements 1 may be in direct electrical contact and connection with the circuit board 7, so as to minimize the number of leads installed inside the fountain housing 2. Preferably, the light-emitting elements 1 on the upper surface of the circuit board 7 are distributed evenly along the periphery of the installation port of the circuit board 7 for the outlet pipe 9 to pass through. Preferably, each of the light-emitting elements 1 on the upper surface of the circuit board 7 correspond to one of the point light sources forming the second light-emitting portion, so that the light beams emitted by the first light-emitting elements 1 are casted outward the fountain housing 2 through the corresponding point light sources of the second light-emitting portion. Preferably, the light-emitting elements 1 on the upper surface of the circuit board 7 may be located right below the point light sources of the second light-emitting portion. Preferably, the light-emitting elements 1 on the lower surface of the circuit board 7 are circularly distributed along the periphery of the circuit board 7, so that each of the second light-emitting elements 1 has a minimal distance to the corresponding part of the inner wall of the fountain housing 2, thereby minimizing light loss that happens when the light from the foregoing light-emitting elements 1 travels outward the fountain housing 2. With the foregoing configuration, since the light-emitting elements 1 is in direct electrical contact and connection with the circuit board 7, obstruction in the fountain housing 2 caused by the wiring 10 is little, if not none. This makes the light paths from the first light-emitting portion and the second light-emitting portion toward the three-dimensional lampshade free of obstruction, and thus enables uniform light projection, thereby better resembling an UFO in appearance.

According to one preferred embodiment, the light-emitting elements 1 forming the first light-emitting portion are radially closer to the smooth and curved outer peripheral surface of the saucer-shaped cabin 201 than all the electronic components inside the saucer-shaped cabin 201 are, so the electronic components are all located outside the light path from the first light-emitting portion toward the three-dimensional lampshade. Preferably, the first light-emitting portion is formed by plural light-emitting elements 1 that are installed in the saucer-shaped cabin 201 and project light axially from above toward the interior of the fountain housing 2. Preferably, the light-emitting elements 1 are distributed along the periphery of the saucer-shaped cabin 201, and particularly arranged on the surface of the circuit board 7 facing axially downward. More preferably, the light-emitting elements 1 may be arranged near the radially outer edges of the circuit board 7. With the foregoing configuration, since the light-emitting elements 1 are arranged near the radially outer edges, more space can be left in the saucer-shaped cabin 201 for accommodating other electronic components. Besides, the point light sources generate small light cones each having a single light-projecting direction, and this feature ensures uniform lighting at the periphery of the housing, and prevents shadows of the electronic components in the saucer-shaped cabin 201 form falling on the three-dimensional lampshade, thereby providing uniformly projected light and better resembling an UFO in appearance.

Figure 5:
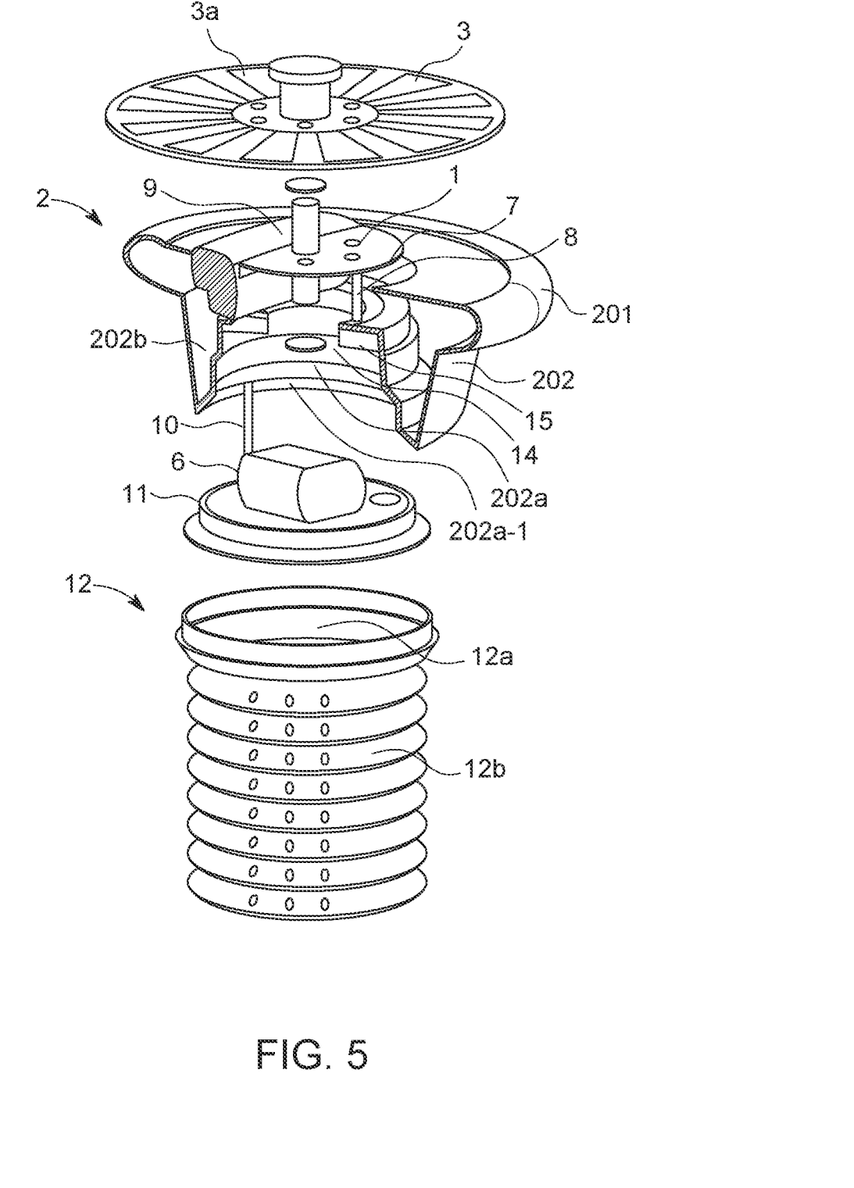
FIG. 5 is a schematic exploded view of the second embodiment of the present invention.

According to one preferred embodiment, the circuit board 7 serves to control the light-emitting elements 1 to emit light beams of different color temperatures, hues and/or luminance. Preferably, the circuit board 7 is located axially atop the saucer-shaped cabin 201. Preferably, the circuit board 7 may be closely fixed to the back of the solar panel 3 arranged at the top of the fountain housing 2, so that the light of the light-emitting elements 1 forming the second light-emitting portion can be projected out through the opening of the solar panel 3 or through the transparent window 3a of the solar panel 3. Preferably, the openings of the solar panels 3 or the transparent windows 3a of the solar panels 3 may be evenly distributed along the periphery of the installation port among the solar panel 3 for the outlet pipe 9 to pass through. Preferably, the opening of the solar panel 3 or the transparent window 3a of the solar panel 3 is water-tightly provided on the surfaces of the solar panel.

Preferably, the circuit board 7 may be shorted by having the liquid sensor contact water so as to meet the working requirement for activation of the water pump 6 and/or the light-emitting elements 1. Preferably, a photosensitive switch may be used to detect the ambient light around the housing, so as to determine whether the working requirement for the light-emitting elements 1 is met. Preferably, the photosensitive switch may be deposited on the upper surface of the circuit board 7 and positionally corresponding to the second light-emitting portion. Preferably, the photosensitive switch may be in direct electrical connection with the circuit board 7, so as to minimize use of wires like leads. Preferably, a storage battery may be connected to the circuit board 7 through a clamping element. Preferably, the foregoing storage battery may at least be used to receive the power generated by the solar panels 3.

According to one preferred embodiment, the cylindrical lower part 202 may be defined by a two-layer wall. Preferably, a chamber 202b that is communicated with the saucer-shaped cabin 201 and air-tight is formed between inner and outer layers of two-layer wall. Preferably, the inner layer of the two-layer wall of the cylindrical lower part 202 acts as a peripheral wall of the pumping chamber 202a in which the water pump 6 is installed.

Preferably, the outer layer of the two-layer wall of the cylindrical lower part 202 is smoothly connected to the outer wall of the saucer-shaped cabin 201, to form the outer surface of the three-dimensional lampshade for uniform light projection. Preferably, the shell that forms the periphery of the saucer-shaped cabin 201 and is, in use, close to the water surface or immersed in water extends and transits to the cone-like peripheral wall underwater through the chamfered portion. Preferably, the cone-like peripheral wall and the peripheral wall of the pumping chamber 202a jointly define the circular chamber 202b. Preferably, the circular chamber 202b peripherally embraces the pumping chamber 202a from outside in an air-tight manner, and is in gas communication with the saucer-shaped cabin 201. Preferably, the outer wall of the circular chamber 202b is smoothly connected to the outer wall of the saucer-shaped cabin 201, so as to form the outer wall of the three-dimensional lampshade for uniform light projection. Preferably, the outer layer of the wall of the cylindrical lower part 202 and the outer wall of the saucer-shaped cabin 201 are smoothly connected, so as to form the outer wall of the three-dimensional lampshade for uniform light projection. Preferably, the inner wall of the circular chamber 202b may act as the inner housing of the cylindrical lower part 202. Preferably, the floor of the saucer-shaped cabin 201 forms the ceiling of the pumping chamber 202a. With the foregoing configuration, the light-emitting elements 1 may at least project light toward an area axially below the fountain housing 2, so as to illuminate water axially below the fountain housing 2 with light of at least one color, thereby adding the atmosphere in which the disclosed fountain lamp is used with a sci-fi touch. Additionally, when the fountain housing 2 is placed on the water surface, the circular chamber 202b is located below the water surface, and thus forms no obstruction to the light-projecting performance of the first and second light-emitting portions.

According to one preferred embodiment, as shown in FIG. 1, the ceiling of the pumping chamber 202a is formed by the floor of the saucer-shaped cabin 201. Preferably, the bottom of the pumping chamber 202a is communicated with water through a filter plate 11. Preferably, the floor of the saucer-shaped cabin 201 is depressed to form a circular pit in the saucer-shaped cabin. The circular pit of the saucer-shaped cabin bottom axially forms a ridge 15 on the ceiling of the pumping chamber. Particularly, the ridge 15 is formed along and near the peripheral wall of the pumping chamber 202a. Preferably, the ridge 15 is formed by having the floor of the saucer-shaped cabin 201 raised toward the pumping chamber 202a. Preferably, the raised portion may be circular and about the center of the ceiling of the pumping chamber 202a. Preferably, the raised portion has a zenith that is radially closer to the peripheral wall of the pumping chamber 202a. Preferably, the distance between the ridge 15 and the peripheral wall is smaller than the distance between the ridge 15 and the center of the ceiling. Preferably, the ridge 15 may extend along the periphery of the pumping chamber 202a to form a closed loop. Preferably, the ridge 15 may extend about the center of the ceiling of the pumping chamber 202a, thereby forming a circular ridge. Preferably, the foregoing circular ridge may divide the ceiling of the pumping chamber 202a into three parts: peripheral rim, the circular ridge, and a round platform. Preferably, the outer edge of the peripheral rim is integratedly connected to the peripheral wall of the pumping chamber 202a. Preferably, the inner edge of the peripheral rim is smoothly and integratedly connected to the outer edge of the circular ridge. Preferably, the inner edge of the circular ridge is smoothly and integratedly connected to the outer edge of the round platform. Preferably, assuming that the center of the floor of the pumping chamber 202a is taken as an axial start point of the fountain housing 2, the distance between the round platform and the floor of the pumping chamber 202a exceeds the distance between the peripheral rim and the floor of the pumping chamber 202a, so that the round platform and the inner peripheral wall of the circular ridge define a semi-closed space 14. The semi-closed space 14 and the surface of the liquid streaming into the pumping chamber 202a work together to preserve the gas left in the pumping chamber 202a. Preferably, assuming that the center of the floor of the pumping chamber 202a is taken as an axial start point of the fountain housing 2, the distance between the round platform and the floor of the pumping chamber 202a exceeds the distance between the peripheral rim and the floor of the pumping chamber 202a. Preferably, a first opening is formed at the center of the ceiling of the pumping chamber 202a for receiving the outlet pipe 9 of the water pump 6. Preferably, the round platform and the inner wall of the circular ridge from a semi-sealed space. The semi-sealed space and the top surface of the water pump 6 form a gas-sealing chamber for storing gas streaming into the pumping chamber in an air-tight manner. Preferably, the raising extent of the circular ridge remains consistent in the axial direction of the fountain housing 2. Preferably, the circular ridge may have a consistent height in the direction toward the pumping chamber 202a. Preferably, the distance between the circular ridge and the peripheral wall of the pumping chamber 202a remains consistent. Preferably, the radius of the circular ridge is greater than the length and width of the water pump 6. Preferably, the circular ridge has a transverse cross-section like a reversed triangle or a trapezoid. Preferably, the ridge at its side closer to the floor of the pumping chamber 202a provided with a first round hole for an electrode pin to pass through. Preferably, the electrode pin air-tightly extends into the pumping chamber 202a through the first round hole. Of course, it is also possible that the electrode pin pass through the floor of the pumping chamber 202a in other ways. For example, this may be achieved simply using mechanical operation performed in site. Preferably, the floor of the saucer-shaped cabin 201 between the circular ridge and the peripheral wall of the pumping chamber 202a is provided with a second round hole that is for a conduit or a lead to pass through. Therein, the water pump 6 may be electrically connected to the circuit board 7 through the foregoing conduit or lead, so as to at least able to receive power from the circuit board 7. With the foregoing configuration, the circular ridge reduces or eliminates reduce or eliminate jittering of the fountain housing 2 caused by wave peak overlap occurring when liquid streaming into the pumping chamber 202a has the liquid surface repeatedly hits and oscillates against the peripheral wall of the pumping chamber 202a. For example, the circular ridge may divide the liquid surface inside the pumping chamber 202a into two parts. The part of the liquid surface located within and restricted by the circle defied by the circular ridge has a reduced space for resonating with the chamber. The ridge helps reduce or eliminate oscillation of the liquid surface in the pumping chamber 202a against the peripheral wall of the pumping chamber 202a, so as to prevent water waves from repeatedly hitting the peripheral wall of the pumping chamber 202a and causing even stronger oscillation of the entire fountain housing 2. In addition, the foregoing configuration may further locate the joint between the outlet pipe 9 and the first opening at the zenith of the semi-closed space 14. The inner wall of the semi-sealed chamber may work with the surface of liquid streaming into the pumping chamber 202a to seal the gas left in the pumping chamber 202a in the semi-sealed chamber. Then it is possible to use the gas to prevent the liquid in the pumping chamber 202a from entering the saucer-shaped cabin 201 through the joint between the outlet pipe 9 and the first opening and to protect the electronic components such as the circuit board 7. The concept is that the waterproofing is relatively easy to achieve at the joint between the bipolar needle electrode and the pumping chamber 202a.

Preferably, the ridge may have a part in a circular shape. Alternatively, the ridge may be a fully circular ridge. Alternatively, the ridge may be of a curved shape other than round. Alternatively, the ridge may be composed of multiple sections or points. Preferably, the ridge may be located on the top of the pumping chamber 202a near the peripheral wall of the pumping chamber 202a. Alternatively, the ridge may be located at another site in the pumping chamber 202a according to practical needs. For example, the ridge may be located on the inner wall of the pumping chamber 202a. Preferably, the water pump 6 may be connected to the interior of the pumping chamber 202a through at least point contact, so as to reduce the impact of vibration caused by the water pump 6 on the fountain housing 2.

Preferably, the outlet pipe 9 is connected to the top of the water pump 6 off-center. With the foregoing configuration, as the water pump 6 operates, due to its own imbalanced movement, the fountain housing 2 not only rotates about an axis direction of the fountain lamp, but also makes the fountain lamp move in a radial direction. The fountain housing so operates together with the light from the light-emitting elements projected through the fountain housing 2 and the water columns created by the water pump 6, forms dynamic fountain scenery. Preferably, a first opening is formed in the middle part of the top surface of the pumping chamber 202a for receiving the outlet pipe 9 of the water pump 6. Preferably, the outlet pipe 9 when installed is parallel to the axis of the pumping chamber 202a. Preferably, the axially center line of the outlet pipe 9 and the axially center line of the pumping chamber 202a may coincide with each other. Preferably, the outlet pipe 9 may be located at the center of the top of the pumping chamber 202a.

Figure 3:
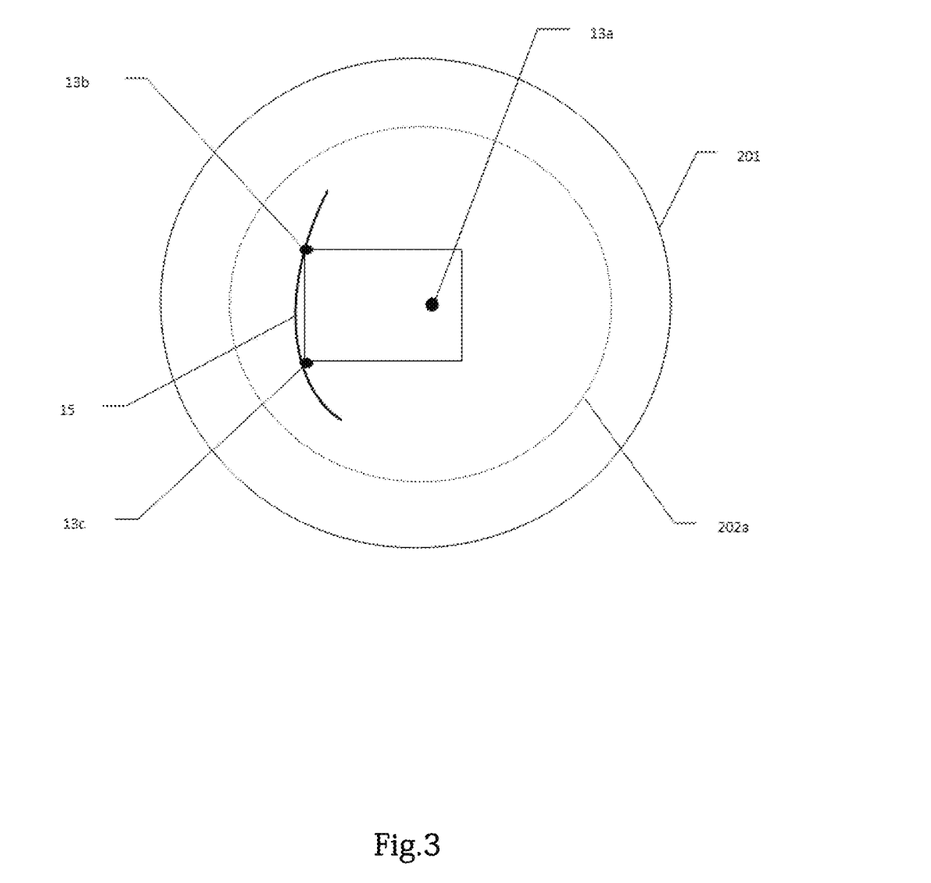
FIG. 3 is a transverse cross-sectional view of the pumping chamber and the water pump of the preferred embodiment of the present invention.
Figure 4:
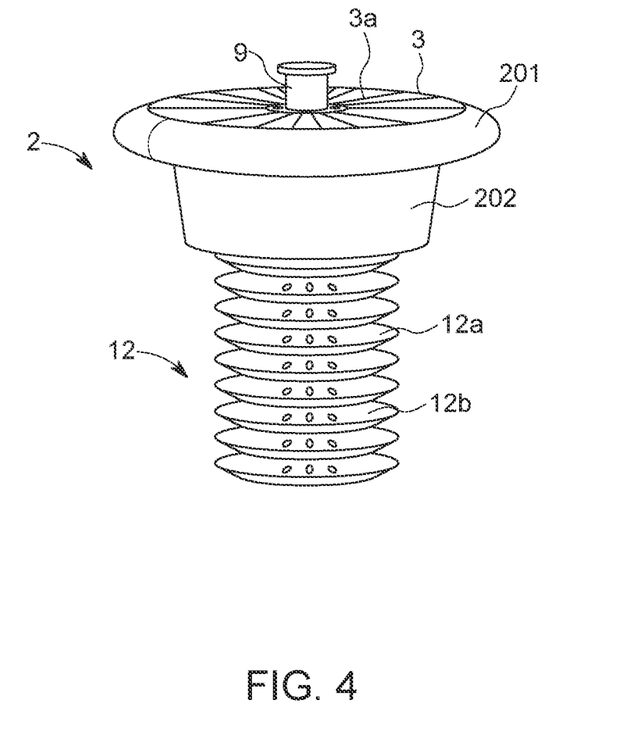
FIG. 4 is a schematic perspective view of another preferred embodiment of the present invention.

Preferably, the joint between the water pump 6 and the outlet pipe 9 may act as the first support point 13a of the water pump 6 that is used to bear the force acting on the water pump 6 in the axial direction of the pumping chamber 202. Preferably, the axial force acting on the water pump 6 at least include the most or all gravity of the water pump 6.

Preferably, as shown in FIG. 3, the water pump 6 may be connected using any two contact points on the ridge near the water pump 6. Therein, one of the contact points acts as the second support point 13b of the water pump 6, and the other contact point acts as the third support point 13c. Preferably, the second support point 13b and the third support point 13c may at least be used to bear the tangential force acting on the ridge in the peripheral direction of the pumping chamber 202a caused by vibration of the operating water pump 6. With the foregoing configuration, the water pump 6 may be firmly secured inside the pumping chamber 202a by means of the three-point fixation achieved by the first support point 13a, the second support point 13b, and the third support point 13c, as opposite to having the water pump 6 directly installed the top of the pumping chamber 202a. This is because when the water pump 6 and the pumping chamber 202a are connected through planar contact, the water pump 6 tends to come off the top of the pumping chamber 202a due to vibration caused by its own operation over time. This can lead to undesired vibration of the fountain housing 2 and is adverse to the objective of using the fountain housing 2 together with the first and second light-emitting portions to provide a lively imitator of a flying saucer.

According to one preferred embodiment, as shown in FIG. 1, at least one mount port 202a-I is provided at the axially lower part of the pumping chamber 202a for receiving a filter plate 11 and/or for connecting to an external component at the lower part of the fountain housings. Preferably, the mount port 202a-I may be a threaded hole, a notch or another structure forming using the structure of the inner layer of the wall of the cylindrical lower part 202.

Preferably, the external components may be selected according to practical needs, without limitation.

According to one preferred embodiment, as shown in FIG. 1, the external component to be connected may be a cleaning and sterilizing portion 12. Preferably, the cleaning and sterilizing portion 12 is used to clean and sterilize waters the fountain lamp floating through. Preferably, the cleaning and sterilizing portion is composed of a foldable, roughly cylindrical storage chamber 12a. Preferably, the cleaning and sterilizing portion is connected to the lower part of the fountain housing 2 through the mount port 202a-I. Preferably, the storage chamber 12a is peripherally provided with permeable holes 12b. Preferably, the axially lower part of the pumping chamber 202a is provided with at least one first mount port that is used to connect the cleaning and sterilizing portion 12. Preferably, the axially lower part of the pumping chamber 202a is provided with at least one second mount port that is used to receive the filter plate 11 for the water pump 6. Preferably, in axis of the pumping chamber 202a, the distance between the first mount port and the floor of the pumping chamber 202a is smaller than the distance between the first mount port and the floor of the pumping chamber 202a. In other words, the first mount port is located axially below the second mount port. Preferably, the cleaning and sterilizing portion 12 may be connected to the axially lower part of the pumping chamber 202a through the first mount port by means of threads, notches or the like. Preferably, the inner cavity of the cleaning and sterilizing portion 12 may be used to store several disinfectant tablets. Preferably, the disinfectant tablets may be selected according to practical applications, without limitation. Preferably, a connector is provided at the axial top of the cleaning and sterilizing portion 12 that allows the cleaning and sterilizing portion 12 to be connected to external components. Preferably, the cleaning and sterilizing portion 12 may be formed by multiple foldable composite units that are integratedly layered. Preferably, each of the composite units may comprise a large-diameter first support ring, a filter, and two small-diameter second support rings. Preferably, the second support rings are located axially above and below the first support ring. Preferably, the first support ring and the second support rings may be placed in the filter. Preferably, the first support ring and the second support rings may all be round in shape. Preferably, the filter may be made of a flexible and stretchable material, such as cloth, so that the axial-direction length of the cleaning and sterilizing portion 12 can be compressed or extended according to practical needs. Alternatively, the filter may be made of other materials according to practical needs. Preferably, the planes in which the first support ring and the second support rings are located are perpendicular to the axis of the cleaning and sterilizing portion 12, respectively. Preferably, each of the composite units has its upper surface provided with a plurality of permeable holes 12b. Preferably, the permeable holes 12b may allow liquid outside the cleaning and sterilizing portion 12 to enter the inner cavity of the cleaning and sterilizing portion 12 for dissolving the disinfectant tablets. Preferably, the permeable holes 12b may be evenly distributed along the peripheral edge at the upper surface of each of the composite units, so as to prevent the disinfectant tablets from directly sinking to the floor of the pool through the permeable holes 12b. Preferably, the composite units have their inner cavities communicated with each other. With the foregoing configuration, the cleaning and sterilizing portion 12 may move with the irregular movements of the fountain housing 2, and reach every corner of the water area to be sterilized, thereby effectively cleaning and sterilizing waters on which the fountain housing 2 floats.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A solar-powered, floating, fountain lamp, comprising a plurality of light-emitting elements, a fountain housing, and a solar panel that is mounted on a top of the fountain housing in a water-tight arrangement,
    wherein, the fountain housing forms a three-dimensional lampshade for a first light-emitting portion, and wherein the fountain housing forms a floating portion of the fountain lamp;
    wherein, the fountain housing is substantially formed as a saucer-shaped cabin with a cylindrical lower part integrally connected thereto; wherein the saucer-shaped cabin is located in an axial upper part of the fountain housing and comprises an outer peripheral surface that is smooth and curved;
    wherein the plurality of light-emitting elements each project a light beam in a different direction;
    wherein, the light-emitting elements project the light beams outward from the fountain housing to form point light sources at a top of the fountain lamp; wherein the point light sources on the top define a second light-emitting portion, such that a light cone formed in a light-projecting direction of the second light-emitting portion interferes with a water column and colors the water column; and wherein the light-emitting elements project light beams inward toward the fountain housing to form the first light-emitting portion, and the first light-emitting portion provides uniform lighting through the three-dimensional lampshade formed by outer walls of the saucer-shaped cabin and outer walls of the cylindrical lower part, wherein the outer walls of the saucer-shaped cabin and the cylindrical lower part are connected;
    wherein the saucer-shaped cabin is air-tight and comprises a liquid sensor constructed from a bipolar needle electrode, which starts from a circuit board inside the saucer-shaped cabin and passes through a water-tight passage in the ceiling of a pumping chamber, so as to enable start/stop of a water pump and/or start/stop of the light-emitting elements by contacting with liquid in the pumping chamber.

2. The solar-powered, floating, fountain lamp of claim 1, wherein the pumping chamber is arranged inside the cylindrical lower part; and wherein an outlet pipe of the pumping chamber axially passes through an inner cavity of the fountain housing for axially guiding water from an outlet of the water pump to the saucer-shaped cabin, thereby enabling formation of plural said water columns that are sprayed outward from the fountain housing.

3. The solar-powered, floating, fountain lamp of claim 1, wherein the circuit board controls and/or drives the water pump and/or the light-emitting elements disposed within the saucer-shaped cabin; and wherein the liquid sensor is connected to or integrated with the circuit board and is used to control start/stop of the water pump and/or to control start/stop of at least one of said plurality of light-emitting element.

4. The solar-powered, floating, fountain lamp of claim 3, wherein the liquid sensor is electrically connected to the circuit board; and an outlet pipe of the water pump and wiring of the water pump enter the pumping chamber by passing through a water-tight opening in a floor of the saucer-shaped cabin that forms the ceiling of the pumping chamber; and wherein, the liquid sensor, the outlet pipe of the water pump, and/or the wiring are located outside of light-projecting paths between the light-emitting elements of the first light-emitting portion and the three-dimensional lampshade.

5. The solar-powered, floating, fountain lamp of claim 1, wherein as compared to all other electronic components located inside the saucer-shaped cabin, the light-emitting elements forming the first light-emitting portion are all radially closer to the smooth; a and curved outer peripheral surface of the saucer-shaped cabin, such that all the other electronic components within the fountain housing are located outside of the light path between the light-emitting elements of the first light-emitting portion and the three-dimensional lampshade.

6. The solar-powered, floating, fountain lamp of claim 1, wherein the circuit board controls the light-emitting elements to emit light beams with diverse color temperatures, hues and/or luminance, and wherein the circuit board is axially located on a top of the saucer-shaped cabin and is attached to a back side of the solar panel arranged at the top of the fountain housing; and wherein the light-emitting elements forming the second light-emitting portion project light beams outward through an opening of the solar panel or through a transparent window of the solar panel.

7. The solar-powered, floating, fountain lamp of claim 1, wherein the cylindrical lower part is defined by a two-layer wall comprising an inner layer and an outer layer; and wherein an air-tight circular chamber formed between the inner layer and the outer layer is communicated with the saucer-shaped cabin, and wherein the inner layer of the two-layer wall of the cylindrical lower part forms a peripheral wall of the pumping chamber for installing the water pump, and the outer layer of the two-layer wall of the cylindrical lower part is connected to the outer wall of the saucer-shaped cabin, so as to form an outer surface of the three-dimensional lampshade that facilitates the uniform lighting.

8. The solar-powered, floating, fountain lamp of claim 7, wherein at least one mount port is provided at an axially lower part of the pumping chamber for receiving a filter plate and/or for allowing the fountain housing to be connected to an external component.

9. The solar-powered, floating, fountain lamp of claim 8, wherein the external component is a cleaning and sterilizing portion, which serves to clean and sterilize waters the fountain lamp floats within.

10. A solar-powered, floating, fountain lamp, comprising at least one light-emitting element, a fountain housing, and a solar panel, wherein the fountain housing forms a floating portion that floats the fountain lamp over a liquid surface; wherein the fountain housing comprises a saucer-shaped cabin located axially on an upper part of the fountain housing, and a pumping chamber located axially in a lower part of the fountain housing; wherein a floor of the saucer-shaped cabin forms a ceiling of the pumping chamber with a water-tight passage therein, and the solar panel is mounted on a top of the saucer-shaped cabin by a water-tight connection and wherein the pumping chamber comprises a water pump, an outlet pipe of the water pump passes through an inner cavity of the fountain housing so that water from an outlet of the water pump is guided to the saucer-shaped cabin and forms a plurality of water columns sprayed outward from the fountain housing;

wherein the fountain housing comprises a liquid sensor constructed from at least one bipolar needle electrode, which has one end being in direct, electric contact with a circuit board and has the other end at least extending below the liquid surface, so that the bipolar needle electrode closes a circuit gate of the water pump and/or the at least one light-emitting element by contacting with the liquid.

11. The solar-powered, floating, fountain lamp of claim 10, wherein the saucer-shaped cabin comprises the circuit board that controls and/or drives the water pump and/or the at least one light-emitting element, wherein the liquid sensor is used to control start of the water pump and/or control start of said at least one light-emitting element.

12. The solar-powered, floating, fountain lamp of claim 10, wherein the outlet pipe of the water pump is provided with a first sealing sleeve in a region passing through the top of the pumping chamber in such a way that liquid in the pumping chamber is prevented from leaking into the inside of the saucer-shaped chamber; and wherein the outlet pipe passes though the top of the pumping chamber on which the solar panel is located through a water-tight passage.

13. The solar-powered, floating, fountain lamp of claim 10, wherein in the pumping chamber, the outlet pipe of the water pump is connected to one side of the water pump off-center, so that as the water pump operates, the fountain housing rotates about an axis of the fountain lamp and also moves in a radial direction.

14. The solar-powered, floating, fountain lamp of claim 10, wherein the at least one light-emitting element comprises a plurality of light-emitting elements; and wherein the plurality of light-emitting elements are disposed on an upper and a lower surface of the circuit board, respectively; and wherein the light-emitting elements on the lower surface form a first light-emitting portion, and the light-emitting elements on the upper surface form a second light-emitting portion.

15. The solar-powered, floating, fountain lamp of claim 10, wherein the fountain housing forms a three-dimensional lampshade for a first light-emitting portion, wherein the three-dimensional lampshade is formed by the saucer-shaped cabin and a cylindrical lower part that are integrally connected to each other, and wherein the saucer-shaped cabin has a smooth and curved outer peripheral surface; and wherein an outer diameter of the saucer-shaped cabin is greater than an outer diameter of the cylindrical lower part.

16. The solar-powered, floating, fountain lamp of claim 15, wherein a second light-emitting portion projects light through a top area in which the solar panel is located and forms point light sources at the top to endow the water columns sprayed outward with colors.

17. The solar-powered, floating, fountain lamp of claim 15, wherein the cylindrical lower part comprises a two-layer wall having an inner layer and an outer layer; and wherein an air-tight chamber is formed between the inner layer and the outer layer and in communication with the saucer-shaped cabin; and wherein the inner layer of the two-layer wall of the cylindrical lower part defines the pumping chamber for containing water.

18. The solar-powered, floating, fountain lamp of claim 10, wherein at least one mount port is provided at an axially lower part of the pumping chamber for receiving a filter plate and/or for connecting to an external component at the lower part of the fountain housing.

* * * * *